(12) United States Patent
Teng et al.

(10) Patent No.: US 7,890,541 B2
(45) Date of Patent: Feb. 15, 2011

(54) PARTITION BY GROWTH TABLE SPACE

(75) Inventors: James Zhu-Chia Teng, San Jose, CA (US); Frances Hwa Villafuerte, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 11/356,801

(22) Filed: Feb. 17, 2006

(65) Prior Publication Data

US 2007/0198591 A1 Aug. 23, 2007

(51) Int. Cl.
G06F 7/00 (2006.01)
G06F 17/30 (2006.01)
(52) U.S. Cl. .................... 707/802; 707/791
(58) Field of Classification Search ............. 707/200
See application file for complete search history.

(56) References Cited

U.S. PATENT DOCUMENTS

| | | | | |
|---|---|---|---|---|
| 5,561,786 | A * | 10/1996 | Morse | 711/170 |
| 6,026,412 | A | 2/2000 | Sockut et al. | 707/200 |
| 6,411,964 | B1 | 6/2002 | Iyer et al. | 707/200 |
| 6,754,656 | B1 | 6/2004 | Cornwell et al. | 707/8 |
| 7,136,981 | B2 * | 11/2006 | Burch et al. | 711/170 |
| 2004/0199512 | A1 * | 10/2004 | Cornwell et al. | 707/9 |
| 2004/0260684 | A1 * | 12/2004 | Agrawal et al. | 707/3 |
| 2005/0027692 | A1 * | 2/2005 | Shyam et al. | 707/3 |
| 2006/0036790 | A1 * | 2/2006 | Peterson et al. | 710/200 |

OTHER PUBLICATIONS

Lehman et al., "An Evaluation of Starburst's Memory Resident Storage Component," IEEE, 1992.*
Carino Jr. et al., "StorHouse/Relational Manager (RM)—Active Storage Hierarchy Database System and Applications," Proceedings of 17th IEEE Mass Storage Systems Symposium, 2000.*
Sam R. Alapati, "Ch. 6 Managing Tablespaces," Expert Oracle Database 11 G Administration, 2009, ,Part 2, 215-259.*

* cited by examiner

Primary Examiner—Pierre M Vital
Assistant Examiner—Rachel J Lee
(74) Attorney, Agent, or Firm—Yee & Associates, P.C.; Elissa Y. Wang (57) ABSTRACT

A computer implemented method, apparatus, and computer usable program code for managing a table space for a database. The table space is searched to find available free space in a set of partitions in the table space in response to receiving a request to insert a record into a database table in the database. A new partition is created for the table space based on a size for the new partition in response to determining free space is unavailable for the record in the set of partitions. The record is inserted into the new partition.

19 Claims, 4 Drawing Sheets

PARTITION BY GROWTH TABLE SPACE

BACKGROUND OF THE INVENTION

1. Field of the Invention

The present invention relates generally to data processing, and in particular to a computer implemented method and apparatus for managing a database. Still more particularly, the present invention relates to a computer implemented method, apparatus, and computer usable program code for automatically partitioning a table space for a database.

2. Description of the Related Art

Modern data access systems efficiently provide access to large amounts of data. Often information is stored in databases to allow multiple users to access the stored information as needed. Databases may use various table space structures based on the user's needs. A table space is an abstraction of a collection of containers in which database objects, including tables, are stored. A table space provides a level of indirection between a database and the tables stored within the database. The data, index, long field, and large object (LOB) portions of a table can be stored in the same table space or can be individually broken out into separate table spaces.

A table within a table space may be searched for uniquely identified elements allowing information to be extracted from the table space. Expanding a database while still keeping the required parameters necessary for indexing, searching, and linking the table space may be very difficult.

A segmented table space is composed of multiple segments that are linked together to access information within the table space. A segmented table space may allow for improved space management and techniques to improve query performance. One of the limitations present with the use of a segmented table space is the size limitation of the data set. Due to increasing data loads and general advances in information technology, the current size limits of a segmented table space may not be acceptable for many users. Because the segmented table space is not partitioned, maintenance operations cannot be performed at the partition level.

Database users are often faced with the need to use a partitioned table space to circumvent space limitations. Partitioned table spaces are able to accommodate a large table size and may allow the user to perform database maintenance operations, such as database backup, recovery, and reorganization operations at the partition level and in parallel. A partitioned table space also has drawbacks. For example, in a range-partitioned table space, the size of the table space in terms of the number of partitions and a key range for each partition is defined at the time the table space is created. In many cases, it is difficult if not impossible to find adequate partitioning parameters such as a defined key range for each partition. Additionally, the user needs to be able to accurately predict the size of the table space prior to actually using the table space.

Adding partitions may not be possible or may require redefining the table space parameters and moving data among partitions requiring additional time and effort. As a result, incrementally increasing table space as needed using currently available systems is often inefficient and impractical to most database users.

SUMMARY OF THE INVENTION

The aspects of the present invention provide a computer implemented method, apparatus, and computer usable program code for managing a table space for a database. The table space is searched to find available free space in a set of partitions in the table space in response to receiving a request to insert a record into a database table in the database. A new partition is created for the table space based on a size for the new partition in response to determining free space is unavailable for the record in the set of partitions. The record is inserted into the new partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
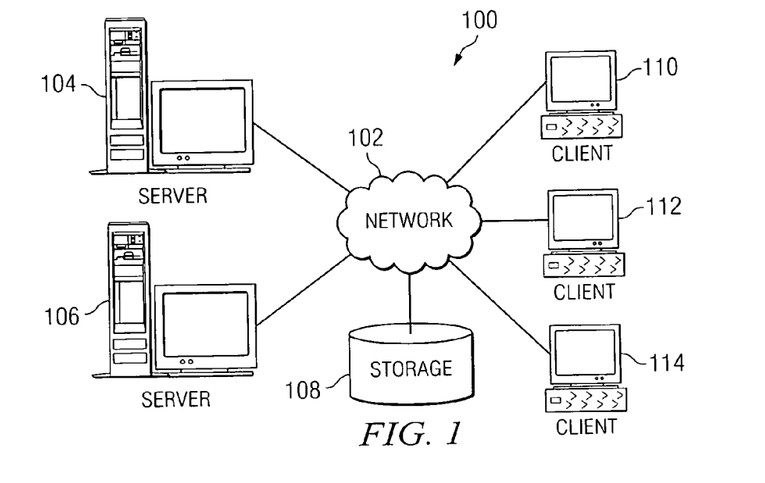
FIG. 1 is a pictorial representation of a network of data processing systems in which aspects of the present invention may be implemented.
Figure 2:
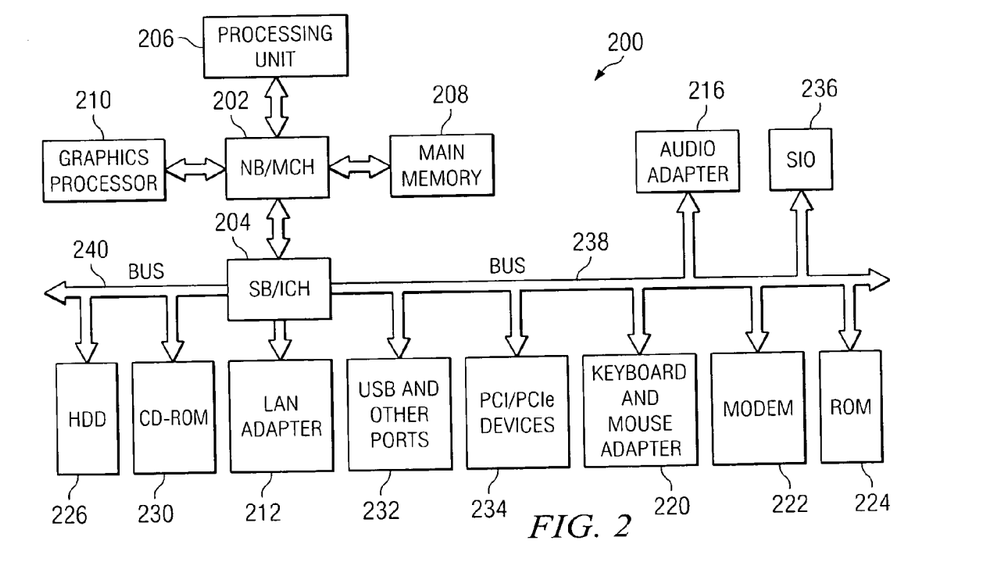
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 may be a host device or mainframe computer accessible by numerous users through network 102. Storage unit 108 may be a database containing table space that may be accessed through network 102. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients or terminals to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or LAN adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The different aspects of the present invention provide a computer implemented method, apparatus, and computer usable program code for automatically adding partitions within a database table space based on growth. Although each table space is partitioned, each partition may possess segmented organization and segmented space management capabilities without the need for defining a key range. The partitioned table space allows partitions to be added as needed to accommodate a very large table that is expanding. A key range is a range of key values for which data will be inserted into the table and is known and before creating a range partitioning table. Aspects of the present invention provide a table space that may be partitioned by size rather than by a key range. Partitions may be added to increase the table space for a growing database table because the partition by growth table space is not partitioned by a key range.

For a range-partitioned table, database administrators identify table columns that may be used as the partitioning keys for data placement. Embodiments of the present invention provide a partitioned table space that may grow for large tables without the need to identify table columns for data distribution. In addition, the partition by growth table space helps alleviate the data skewing problems that may happen with range-partitioned tables.

The segmented structure that may be used in the different illustrative embodiments affords better space management and mass delete capabilities over non-segmented structures. Each partition in a set of partitions allows utilities to continue to provide the utilities partition level operation and parallelism. Multiple partitions allow database administrators/users to perform database maintenance operations at the partition level and may also be done in parallel. The set of partitions contains one or more partitions in these illustrative examples.

Figure 3:
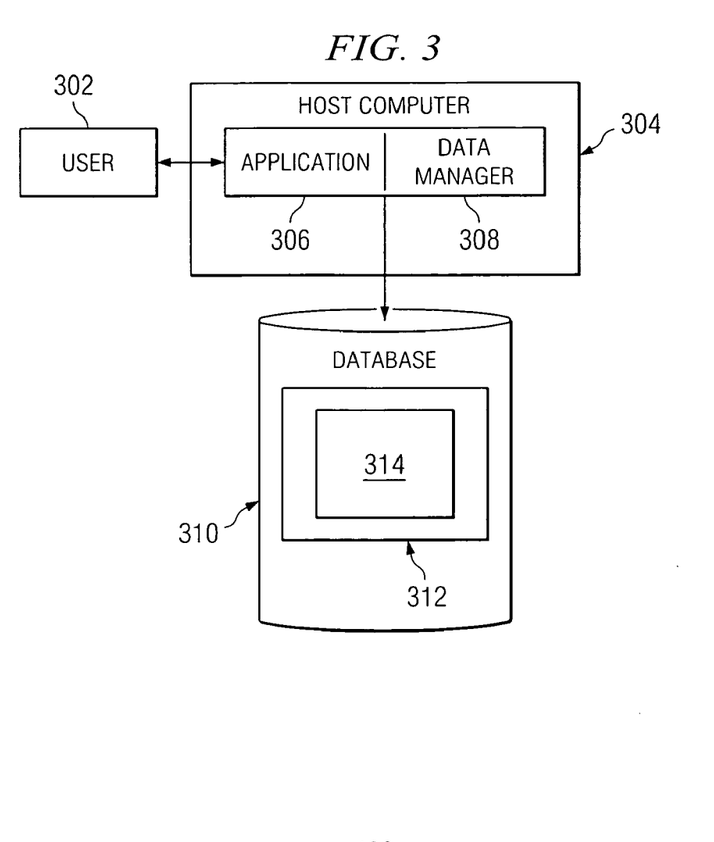
FIG. 3 is a block diagram of a database system in accordance with an illustrative embodiment of the present invention.

FIG. 3 is a block diagram of a database system in accordance with an illustrative embodiment of the present invention. User 302 accesses host computer 304, which houses application 306 and data manager 308. User 302 may use application 306 to access database 310 and table space 312 stored on database 310.

In an illustrative embodiment, host computer 304 is a mainframe computer. Mainframe computers are high-performance central computers shared by multiple users connected to the mainframe by terminals. In another illustrative embodiment, host computer 304 may be a cluster of servers or a Web server accessible to numerous users. User 302 may be at least one client, terminal, person, program, or device accessing database 310 using application 306. User 302 may be multiple users accessing host computer 304. Host computer 304 may be a server, such as server 104 of FIG. 1, which allows user 302 to access host computer 304.

Application 306 and data manager 308 may be a database management system (DBMS), which is executed by host computer 304 to provide user 302 access to database 310. Application 306 and data manager 308 may be located on different computers, depending on particular implementation. For example, user 302 may dispatch a request for access to database 310 by way of application 306. Application 306 sends user requests to data manager 308. In response to receiving the user requests, data manager 308 retrieves the data requested from table space 312 and returns the retrieved data to user 302 through application 306.

Additionally, the user may request storage of information, such as records through application 306. As existing partitions within table space 312 are filled, new partitions are created and added within table space 312 in these examples. As a result, partitions are added automatically or by data manager 308 as needed based on growth of a table in table space 312. The addition of partitions occurs because the partition is based on size. With this type of mechanism, an estimation of future needs as required by range-partitioning tables is not necessary.

Database lock 314 is used to provide concurrency control. Common uses of locks are, for example, to ensure that only one user can modify a record at a time, that a table cannot be dropped if another user is querying the table, and that one user may not delete a record while another is updating the record. In one illustrative embodiment, database lock 314 utilizes selective partition locking. Selective partition locking as implemented using database lock 314 reduces global lock volume by locking only a partition accessed by a user instead of the entire table space. This type of locking allows another user concurrent access to other partitions within the table space.

Figure 4:
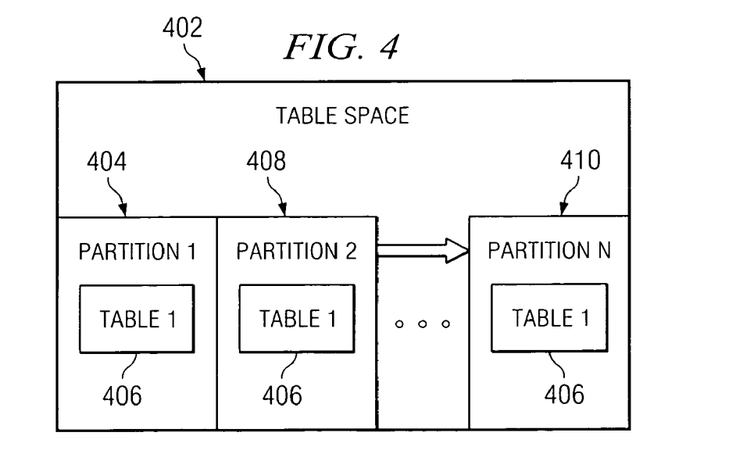
FIG. 4 is block diagram of a partitioned by growth table space within a database in accordance with an illustrative embodiment of the present invention.

FIG. 4 is block diagram of a partitioned by growth table space within a database in accordance with an illustrative embodiment of the present invention. In this example, table space 402 is stored in a relational database, such as database 310 of FIG. 3. Table space 402 is a named set of a set of data files that provides storage for database tables. A set of data files is one or more data files in which each partition is one data file. The data file of each partition includes a group of related data records. For example, the data file for a partition may include records that are stored on part of the table stored in table space 402, such as customer numbers and phone numbers associated with each customer number. In an illustrative embodiment of table space 402, the physical space for each partition is allocated on demand. A new partition is added if no space is present in table space 402 for a requested operation on table space 402. In these examples, the requested operation or demand may be requested by a user, application, data manager module, structured query language keyword, or other process or party that may control table space 402. For example, if a user adds a new customer profile to table space 402, the record of the new customer profile is saved to table space 402. If no room is present in an existing partition or partitions within table space 402 to save the record, a new partition is created to save the record. Partitions are added by data manager components, such as data manager 308 of FIG. 3.

In the illustrative examples, table space 402 is initially a single partition table space, including only partition 1 404. Table space 402 may be created by specifying growth characteristics and new keywords on the structured query language (SQL) statements. Structured query language is a standard interactive and programming language for getting information from and updating a database. For example, structured query language is used to update, insert, and delete data, as well as specifying growth characteristics for new partitions. Additionally, structured query language may be used to create and drop portions of a table and table space. Growth characteristics define how the table space grows and new partitions as they are added. For example, growth characteristics may specify parameters and limitations, such as the maximum number of partitions, the size of each new partition, and how new partitions are cataloged.

Through structured query language statements, the user may select the size of each partition based on demand. For example, the size of partition 1 404 may be less than the maximum partition size or of subsequently created partitions. In one example, a range may be established based on the data space environment. This range may be, for example, between 1 gigabytes to 64 gigabytes although any range may be used depending on the implementation. Table space 402 may automatically grow when all available free space in table space 402 is used and table space 402 has not yet reached the maximum partition limit for table space 402. The data manager may allocate space for the new partition and configure the newly created partition to resemble the other partitions on table space 402. In one example, table space 402 may grow multiple partitions up to a partition limit of 128 terabytes.

Partition 1 404 stores table 1 406 and may have a segmented structure or segmented table space. Once partition 1 404 is filled, the data manager creates partition 2 408. If partition 1 404 and partition 2 408 are filled, then the data manager creates additional partitions, such as partition N 410, as space is required to allow further database operations. These operations include, for example, saving data into table 1 406. Partition 2 408 also contains table 1 406.

As physical space for each new partition is added, the data manager information is updated to ensure that new partitions are accessible and that the database system functions as needed. For example, data manager information may contain catalog information regarding the new partition. The catalog information may include structured query language statements for creating additional partitions within the table space. For example, structured query language keywords may be used to update partition columns relating to the number of physically defined partitions. For example, the structured query language keyword MAXPARTITIONS may be added to the database statement defining and specifying the maximum number of partitions for table space 402 shown by partition N 410. The physical data file for partition 1 404 through partition N 410 is defined by demand or request to add data to the partitions.

Default values for the maximum number of partitions may be established as needed by the user. For example, the default value for the maximum number of partitions may be 256. Structured query language keyword DSSIZE may be used to indicate the maximum size of each partition. The default value may be, for example, 4 gigabytes. The SEGSIZE may indicate the number of pages for each segment. The default value may be four for each partition. As partitions are added, utilities continue to function at the partition level allowing continued parallelism capabilities.

The database manager may use various utilities or operations to control functions within table space 402 and corresponding partitions. A utility or reorganization operation may allow each partition to be accessed separately for actions such as, for example, copy, recover, insert, update, delete, and covering any number of database operations.

Figure 5:
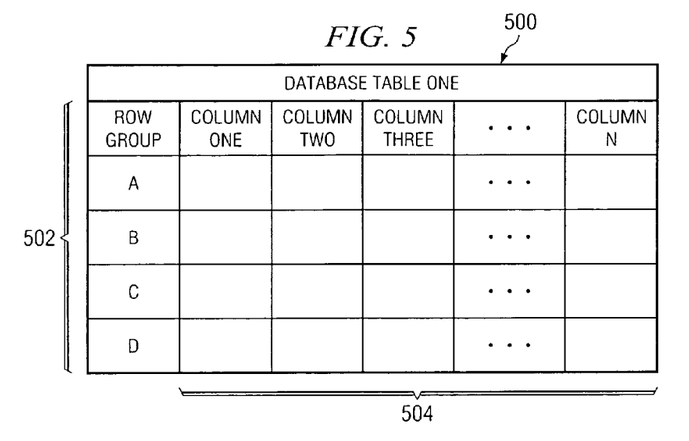
FIG. 5 is a block diagram of a database table in accordance with an illustrative embodiment of the present invention.

FIG. 5 is a block diagram of a database table in accordance with an illustrative embodiment of the present invention. Database table 1 500 may be a database table, such as table 1 406 of FIG. 4. In this example, database table 1 500 includes rows 502 and columns 504. Database table 1 500 may include any type of information or data for the user. A record is a representation of a single row of a table or other data, such as a group of related data, words, fields, or other information treated as a unit.

Figure 6A:
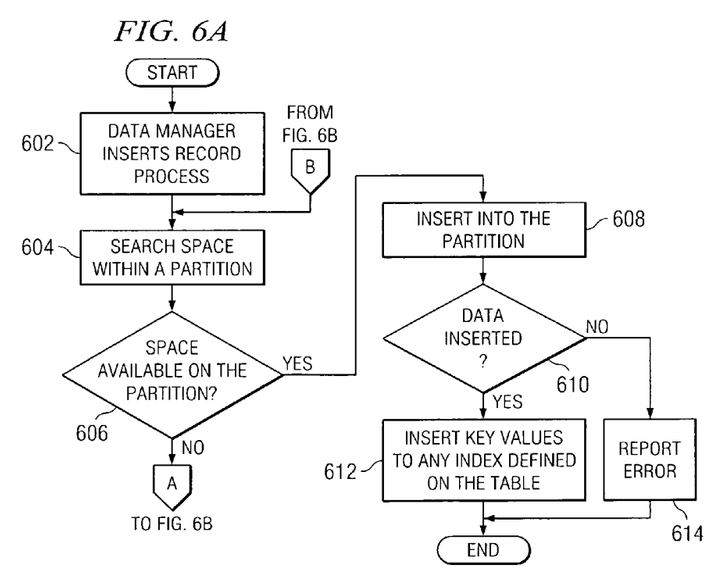
FIGS. 6A-6B are a flowchart illustrating partition growth in accordance with an illustrative embodiment of the present invention.
Figure 6B:
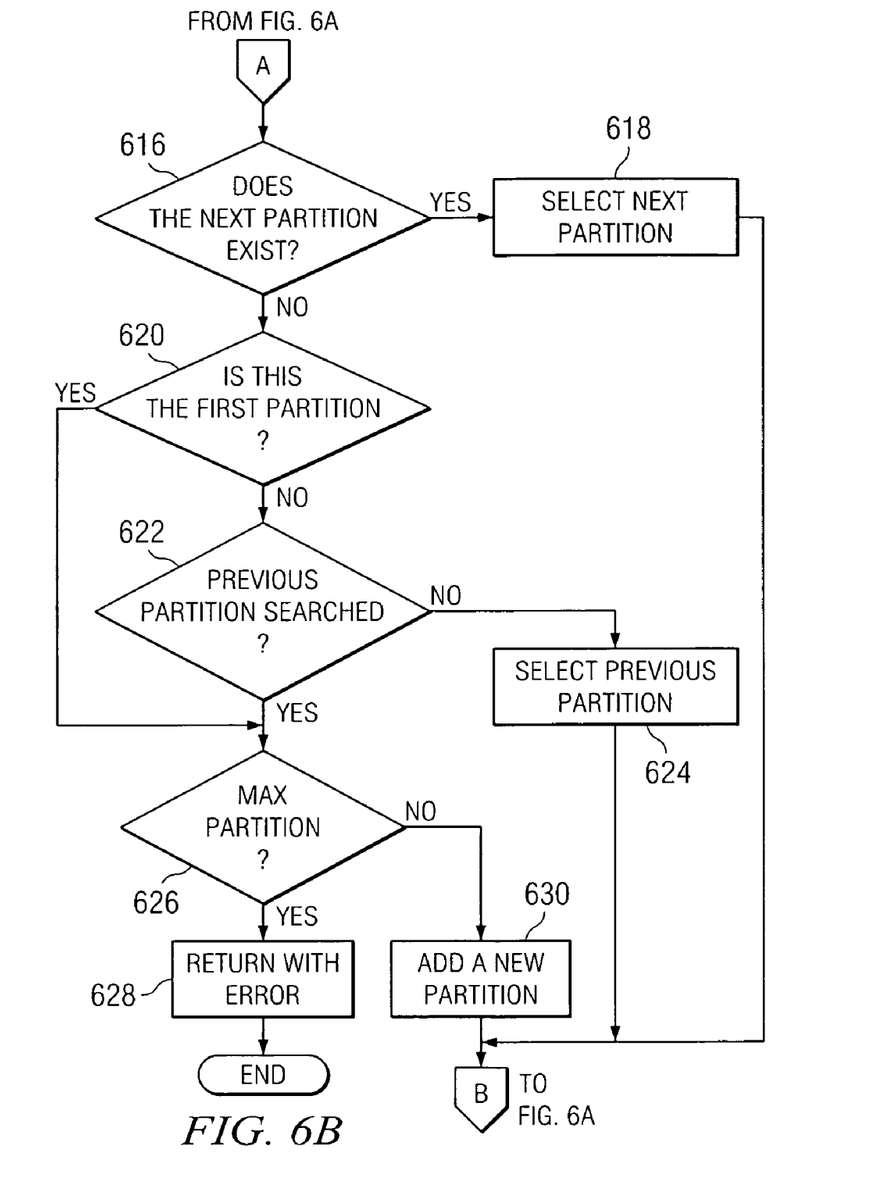

FIGS. 6A-6B are a flowchart illustrating partition growth depicted in accordance with an illustrative embodiment of the present invention. The process shown in FIGS. 6A-6B may be implemented by a data manager module, such as data manager 308 of FIG. 3 to add new partitions to a table space, such as table space 402 in FIG. 4.

The process begins as the data manager inserts record process (step 602). The record process may be a request such as a command or other operation that the data manager is to perform. For example, the record process may be a structured query language statement to store a record in the table space. The record process may have been initially requested by a user through an application using a structured query language statement that is executed by the data manager.

The process then searches the space within a partition (step 604). In one illustrative embodiment, if the previous insert position is known, the process may search the partition of the previous insert position first. The previous insert position may be the partition in which the last record was stored within the table space. Alternatively, the search may begin at the first partition created or an index may be used to determine an appropriate partition to initially search. The first partition is the first partition created on the table space and the first defined partition.

Next, the process determines whether space is available on the partition (step 606). In these examples, space is available if sufficient space is present on the partition to store the record. If space is available in the partition in step 606, the process inserts the data record into the partition (step 608). The data record is inserted in the partition because sufficient space is present for the data record in the existing partition. The process then determines whether the data was inserted into the partition (step 610).

If the data was inserted, the process inserts key values to any index defined on the table (step 612) with the process terminating thereafter. The index is a storage position or register, the contents of which identify, for example, a particular element in a table. The index may be a set of pointers that are logically ordered by the values of a key. Indexes provide quick access to data and can be used to enforce uniqueness on the rows in the table. When an index is requested, the database manager builds the structure and maintains it automatically. The index is used by the database manager to improve performance and ensure uniqueness. If the process determines the data was not inserted in step 610, the process reports an error (step 614) with the process terminating thereafter. The error may be displayed to the user to allow the user to determine why data was not inserted.

Returning to step 606, if the process determines that space is not available, the process determines whether a next partition exists (step 616). The next partition is the partition created chronologically after the current partition. Various information including the index, information stored by the data manager, or a linked list may be used by the data manager to determine which partition is the next partition. For example, the next partition may be the next partition as indicated by the index. If the next partition does exist, the process selects the next partition (step 618) and then returns to step 604. The next partition is made the current partition for searching purposes when the next partition is selected in step 618.

If the next partition does not exist in step 616, the process determines whether the partition being looked at is the first partition (step 620). If the partition is not the first partition, the process determines whether the previous partition has been searched (step 622). The previous partition is the partition created chronologically before the current partition. The previous partition may be determined in the same manner as the next partition in step 616. For example, the data manager may use an indexed number of partitions to determine the previous partition. In one illustrative example, the process tracks the partitions that have been searched to avoid duplicating that search and to more efficiently locate available space. If the previous partition has not been searched, the process selects the previous partition (step 624) and returns to step 604.

Returning again to step 620, if the present partition is the first partition, the process determines whether the maximum number of partitions have been created (step 626). The maximum number of partitions is a partition limit that may vary based on the database system and method used, available memory, and other hardware or software limitations. If the maximum number of partitions has been created, the process returns an error (step 628) with the process terminating thereafter. The error may be displayed to the user indicating that the maximum number of partitions has already been created. In one example, the user may use the information from the error to add more capacity to the database system.

Returning again to step 622, if the process has searched through the previous partition, the process proceeds to step 626 as described above. If the process determines that the maximum number of partitions has not been created in step 626, the process adds a new partition (step 630). In these illustrative examples, the new partition is added by allocating physical space and creating a new underlying data file. Adding a partition may also involve updating the information used by the data manager that allows a partition to be fully utilized. For example, when the partition is added, updates may be made to the table space catalog.

In addition to cataloging new information in an illustrative embodiment, the process may determine whether the system is a data sharing system. A data sharing system is a device or computer, such as host computer 304 of FIG. 3 that may share data with a number of users. A data sharing system may share data using data base management system applications running on different host computers, such as a cluster of data base management systems that belong to a single data sharing group. Each database management system in a data sharing group is called a data sharing member. Because numerous users, members, and devices may access the data sharing system, any changes in the partitioning of the table space need to be updated to the other devices. If the system is a data sharing system, the process may broadcast information about the new partition to the other members. The process then returns to step 604 so that the data may be inserted into the newly created partition.

Thus, the aspects in illustrative embodiments provide a computer implemented method, apparatus, and computer usable program code for automatically allocating space for new partitions within a database table space based on growth. As a result, partitions are added to a table space, as needed allowing user more flexibility. Particularly, key ranges are not needed for each partition. The user can easily expand beyond 64 GB. Data space management performance is increased because of multi-user access of different partitions and mass deletion capabilities, and new partitions are not allocated until the new space is needed. In addition, utilities may be operated on different partition levels including newly added partitions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a partitioned table space for a database, the computer implemented method comprising:
   responsive to receiving a request to insert a record into a database table in the database, searching the partitioned table space to find available free space in a set of partitions in the table space, wherein each of the set of partitions which vary in size is created without a need for defining a key range for the set of partitions, the each of the set of partitions is composed of plurality of segments; and each of the plurality of segments is in fixed size;
   responsive to a determination that free space is unavailable for the record in the set of partitions, creating a new partition for the table space based on a size for the new partition, wherein the new partition is not created based on a key range for the new partition, and wherein the new partition is composed of the plurality of segments, and wherein the size for the new partition is determined from growth characteristics and new keywords in a structured query language statement, and wherein the size for the new partition is not defined at the time the table space is created; and
   inserting the record into the new partition.

2. The computer implemented method of claim 1, wherein the creating step further comprises:
   allocating physical space for the new partition.

3. The computer implemented method of claim 1, wherein the creating step further comprises:
   updating information about the new partition.

4. The computer implemented method of claim 3, wherein the updating step comprises updating catalog information about the new partition in a database manager.

5. The computer implemented method of claim 1, wherein the creating step further comprises:
   broadcasting information about the new partition to members that access the table space.

6. The computer implemented method of claim 1, wherein the searching step further comprises:
   determining if there is free space in the set of partitions of the table space for a record.

7. The computer implemented method of claim 6, further comprising:
   responsive to a determination that the record fits within the table space, inserting the record into the database table.

8. The computer implemented method of claim 1, wherein the table space uses a locking mechanism.

9. The computer implemented method of claim 8, wherein the locking mechanism uses selective partition locking for better concurrency.

10. The computer implemented method of claim 1, wherein a user of the table space may set any of a maximum number of the set of partitions and the maximum size of each of the set of partitions.

11. The computer implemented method of claim 1, wherein the table space is segmented and includes a non-partitioned index on a table within the table space.

12. The computer implemented method of claim 1, further comprising:
defining growth characteristics of the table space and the new partition.

13. The computer implemented method of claim 1, wherein the searching step comprises at least one of searching the set of partitions for available space from a last inserted record and searching forward from the partition housing the last inserted record to a first created partition.

14. The computer implemented method of claim 13, wherein the creating step comprises:
allocating a portion of the table space for the new partition; and
defining the new partition for access by a data manager.

15. The computer implemented method of claim 1 wherein the step of creating a new partition for the table space based on a size for the new partition further comprises:
responsive to a determination that free space is unavailable for the record in the set of partitions, creating a new partition for the table space based on a size for the new partition, wherein the size for the new partition is determined from growth characteristics and new keywords in a structured query language statement, and wherein the size for the new partition is not defined at the time the table space is created.

16. The computer implemented method of claim 15, wherein the step of creating a new partition for the table space based on a size for the new partition, wherein the size for the new partition is determined from growth characteristics and new keywords in a structured query language statement further comprises:
creating a new partition for the table space based on a size for the new partition, wherein the size for the new partition is determined from growth characteristics and new keywords in a structured query language statement, wherein the growth characteristics are selected from the group consisting of a maximum number of partitions, the size of the new partition, and a cataloging method for the new partition.

17. The computer implemented method of claim 15, wherein the step of wherein the step of creating a new partition for the table space based on a size for the new partition, wherein the size for the new partition is determined from growth characteristics and new keywords in a structured query language statement further comprises:
creating a new partition for the table space based on a size for the new partition, wherein the size for the new partition is determined from growth characteristics and new keywords in a structured query language statement, wherein the new keywords in a structured query language statement are selected from the group consisting of a maxpartitions statement that specifies the maximum number of partitions in the table space, a dssize statement that specifies the a maximum size of the new partition, and a segsize statement that indicates a number of pages for the new segment.

18. A system comprising:
a database;
a computer operably connected to the database, including a processor for processing an application and a storage operably connected to the processor for storing the application, wherein the application may be loaded into a main memory for execution by the processor and wherein the application: responsive to receiving a request to insert a record into a database table in the database, searches the partitioned table space to find available free space in a set of partitions in the table space, wherein each of the set of partitions which vary in size is created without a need for defining a key range for the set of partitions, the each of the set of partitions is composed of plurality of segments; and each of the plurality of segments is in fixed size; responsive to a determination that free space is unavailable for the record in the set of partitions, creates a new partition for the table space based on a size for the new partition, wherein the new partition is not created based on a key range for the new partition, and wherein the new partition is composed of the plurality of segments, and wherein the size for the new partition is determined from growth characteristics and new keywords in a structured query language statement, and wherein the size for the new partition is not defined at the time the table space is created; and inserts the record into the new partition;
at least one client operably connected to the computer with access to the database.

19. A tangible computer storage medium having a computer program product encoded thereon for managing a table space for a database, the computer program product including:
computer usable program responsive to receiving a request to insert a record into a database table in the database, for searching the partitioned table space to find available free space in a set of partitions in the table space, wherein each of the set of partitions which vary in size is created without a need for defining a key range for the set of partitions, the each of the set of partitions is composed of plurality of segments; and each of the plurality of segments is in fixed size;
computer usable program code responsive to a determination that free space is unavailable for the record in the set of partitions, for creating a new partition for the table space based on a size for the new partition, wherein the new partition is not created based on a key range for the new partition, and wherein the new partition is composed of the plurality of segments, and
wherein the size for the new partition is determined from growth characteristics and new keywords in a structured query language statement, and wherein the size for the new partition is not defined at the time the table space is created; and
computer usable program code for inserting the record into the new partition.

* * * * *

UNITED STATES PATENT AND TRADEMARK OFFICE
CERTIFICATE OF CORRECTION

PATENT NO.        : 7,890,541 B2                                                          Page 1 of 1
APPLICATION NO.   : 11/356801
DATED             : February 15, 2011
INVENTOR(S)       : Teng et al.

It is certified that error appears in the above-identified patent and that said Letters Patent is hereby corrected as shown below:

On the title page, item [75] should read:

Inventors:  James [[Zhu]] Zu-Chia Teng, San Jose, CA;
            Frances Hwa Villafuerte, San Jose, CA;
            Julie Ann Watts, Morgan Hill, CA Signed and Sealed this
Twenty-sixth Day of June, 2012

David J. Kappos
*Director of the United States Patent and Trademark Office*